Aug. 13, 1935.  H. S. BURNHAM  2,010,845

MULTIPLE EXPANSION ENGINE

Filed Jan. 27, 1934  7 Sheets-Sheet 3

INVENTOR
*Harry S. Burnham*
BY
*S. C. Yeaton*
ATTORNEY

Aug. 13, 1935.  H. S. BURNHAM  2,010,845
MULTIPLE EXPANSION ENGINE
Filed Jan. 27, 1934   7 Sheets-Sheet 4

INVENTOR
Harry S. Burnham
BY S.C. Yeaton
ATTORNEY

Aug. 13, 1935.  H. S. BURNHAM  2,010,845

MULTIPLE EXPANSION ENGINE

Filed Jan. 27, 1934   7 Sheets-Sheet 5

INVENTOR
*Harry S. Burnham*
BY *S. C. Yeaton*
ATTORNEY

Patented Aug. 13, 1935

2,010,845

UNITED STATES PATENT OFFICE 2,010,845

MULTIPLE EXPANSION ENGINE

Harry S. Burnham, Schenectady, N. Y.

Application January 27, 1934, Serial No. 708,562

26 Claims. (Cl. 121—105)

This invention relates to multiple expansion engines and particularly to apparatus for distributing steam to the cylinders of such an engine, whereby the operation of the engine is controlled to effect, at certain times, single expansion operation of all of the cylinders, or to effect, at other times, multiple expansion operation.

An object of the invention is to provide apparatus for distributing steam of the character aforementioned whereby a triple expansion engine will start with live steam in all of its cylinders, i. e. in single expansion operation, and will be so driven for a few strokes and will normally thereupon automatically go into triple expansion operation, whereby the engine may be manually controlled for keeping said engine in single expansion operation of a majority of the cylinders as long as desired, or whereby the engine may be manually controlled so as to change from triple expansion operation to single expansion operation of a majority of the cylinders when desired.

Another object is to provide a multiple expansion engine embodying one or more low pressure cylinders disposed forwardly of one or more higher pressure cylinders and apparatus for distributing steam for either single or multiple expansion operation of the engine including intercepting valve means for controlling the flow of live steam and exhaust steam from the higher pressure cylinder or cylinders to the low pressure cylinder or cylinders which includes a high pressure steam reducing valve arranged in proximity to the low pressure cylinder or cylinders so as to permit a relatively short travel of the reduced live steam to the low pressure cylinder or cylinders, thereby eliminating the previous practice of passing the live steam first to the location of the higher pressure cylinder or cylinders through the main steam supply pipe and thence forwardly through a relatively long receiver pipe at reduced pressure to the low pressure cylinder or cylinders.

Another object is to provide an engine of the character last described wherein the low pressure cylinders, their distribution valve chests, and a casing for the intercepting valve means are formed as a unitary structure.

Another object is to provide a triple expansion engine embodying a receiver pipe between its higher pressure cylinders and low pressure cylinder or cylinder for delivering steam exhausted thereto from said higher pressure cylinders to the low pressure cylinder or cylinders for operating the low pressure cylinder or cylinders during triple expansion operation of the engine and adapted to serve as a passage to the atmosphere for final exhaust steam of the higher pressure cylinders at certain times when the engine is working single expansion of a majority of the cylinders.

Another object is to provide a multiple expansion engine having steam distribution apparatus embodying valve means operable to insure a substantially constant and adequate amount of back pressure for the higher pressure cylinder or cylinders when the low pressure cylinder or cylinders is being operated by live steam and the steam finally exhausted from the higher pressure cylinder or cylinders is being delivered to the atmosphere.

Another object is to provide an improved valve designed so as to particularly adapt it for use as a back pressure valve for the purpose aforedescribed.

Another object is to provide a multiple expansion engine embodying steam distribution apparatus including intercepting valve means embodying valve means for delivering steam finally exhausted from the higher pressure cylinder or cylinders to the atmosphere during operation of the low pressure cylinder or cylinders by live steam, back pressure valve means of the character aforedescribed and means for manually simultaneously controlling the exhaust valve means and back pressure valve means whereby, when the exhaust valve means is open to deliver finally exhausted steam from the higher pressure cylinder or cylinders to the atmosphere, the back pressure valve means will be operated to insure a substantially constant and adequate amount of back pressure for the higher pressure cylinder or cylinders.

Another object is to provide a triple expansion engine having steam distribution apparatus of the general character aforementioned embodying reducing feed valve means for one or more of the engine intermediate or low pressure cylinders adapted to automatically effect delivery of live steam for said cylinder or cylinders when the pressure of steam being delivered thereto is below a predetermined amount relative to the live steam pressure.

Another object is to provide steam distribution apparatus of the character aforementioned embodying regenerator feed valve means automatically operable for closing and manually controllable for opening to effect when open delivery of live steam to augment other steam being delivered for the operation of the cylinder or cylinders of low pressure.

Another object is to provide improved reducing valves especially adapted for use as parts of the valve means aforedescribed.

Other and further objects of and advantages achieved by this invention will be apparent from the following description of an approved embodiment thereof and the appended claims.

The invention is illustrated in the accompanying drawings wherein.

In compound engines the piston of a high pressure cylinder is actuated by direct admission of boiler or live steam and the piston of a low pressure cylinder is actuated by steam exhausted from the high pressure cylinder during normal or compound operation and the pistons of both the high and low pressure cylinders are actuated by direct admission of boiler or live steam for operation of the engine as a single expansion engine.

In triple expansion engines an intermediate pressure cylinder is employed and during normal or triple expansion operation the piston of a high pressure cylinder is actuated by boiler or live steam, the piston of an intermediate pressure cylinder is actuated by steam exhausted from the high pressure cylinder and the pistons of the low pressure cylinders are actuated by steam exhausted from the intermediate pressure cylinder, and all or a majority of the cylinders are operated by live steam during single expansion operation of all or a majority of the cylinders.

While many of the features of the present invention are applicable for use in both compound and triple expansion engines, in the following description an approved embodiment of the present invention is described adapted for a triple expansion engine.

The working cylinders of the locomotive embodying the invention which is illustrated in the accompanying drawings include a high pressure cylinder 1, an intermediate pressure cylinder 2 oppositely disposed to the high pressure cylinder, and a pair of oppositely disposed low pressure cylinders 3 and 4 spaced forwardly of the cylinders 1 and 2 respectively. Each of these cylinders is provided with distribution and exhaust valve chests, and distribution and exhaust poppet valves of the usual well-known type are disposed in the respective valve chests. The poppet valves of the valve chests of the high pressure cylinder 1 only are shown, see Fig. 1. It will of course be understood, however, that the valve chests of each of the cylinders 2, 3 and 4 are similarly provided with poppet valves. These poppet valves include inlet valve elements 5 and exhaust valve elements 6, and their construction, arrangement and operation are of the usual well-known type, see for instance patent issued to J. Kupka, No. 1,638,736.

The high pressure working cylinder and the intermediate pressure working cylinder, their respective distribution valve chests, and a receiver 7 are all formed in a one piece integral casting, the receiver being disposed between the two cylinders and their valve chests.

Figure 18:
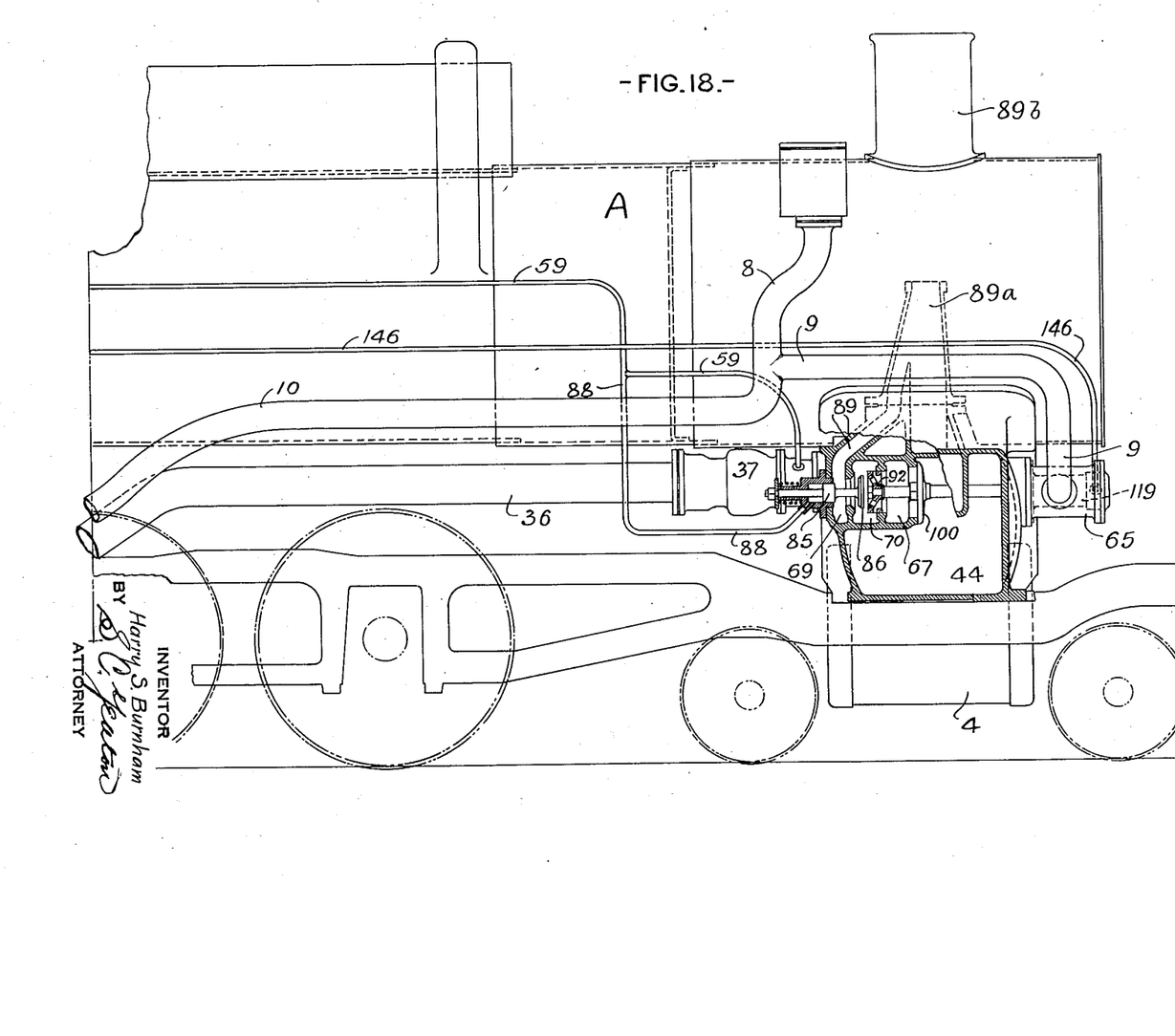
Figs. 18 and 19 are diagrammatic fragmental longitudinal views on a reduced scale of a locomotive embodying the features of the present invention, said features being shown principally in vertical section taken on the broken line XIX—XVIII, Fig. 1, Fig. 18 showing the front end half of the locomotive and Fig. 19 the rear end half of the locomotive, for the purpose of clarity certain of the piping connections being shown in these figures in slightly different positions than those in which they are shown in other of the figures.

A live steam feed pipe 8 is connected at one of its ends with the engine boiler (see Fig. 18) for receiving steam therefrom, and at its opposite end the pipe 8 is separated into two branch pipes 9 and 10. The branch pipe 9 extends forwardly and is connected for delivery of live steam for the low pressure working cylinders for operation thereof either during their single expansion operation or as an auxiliary supply, as hereinafter more fully described. The branch pipe 10 is connected with the inlet valve chests of the high pressure working cylinder 1 for the delivery of steam thereto in the usual manner. At each of the exhaust valve chests of the cylinder 1 an exhaust passageway 11 is formed leading from the respective exhaust ports 6a of the valve chests to the receiver 7. During operation of the engine the exhaust steam from the cylinder 1 will be delivered through these passageways 11 to the receiver 7. A passageway 12 is also connected with the branch pipe 10 and passes under the exhaust valve chest at the rear end of the cylinder 1 to a feed reducing valve 13. It will be understood that where the phrase "live steam" is used in this description and in the appended claims it is intended to mean steam taken directly from the boiler, that is steam which has not been used for the operation of a working cylinder.

The feed reducing valve 13, shown in detail in

Figs. 5 to 8 (also shown in Figs. 1, 2 and 4, these views being on too small a scale to show all of the details), comprises a body or casing 14 which is mounted on the rear end of the receiver 7 over an opening 15 formed therein, the valve 13 being suitably secured to the receiver by studs (not shown). The body portion 14 includes a cylinder 16. A pair of spaced annular ports 17 and 18 is formed in the cylinder near the front end thereof. The portion of the cylinder 16 forward of the port 17 is of a slightly greater diameter than the portion of the cylinder to the rear thereof. An annular passageway 19 is formed around the cylinder in communication with the port 17, and a passageway 20 is formed at one side of the casing 14. The port 17 opens into and the passageway 19 merges with the passageway 20. The passageway 20 is connected with the passageway 12 for receiving live steam therefrom. The port 18 is curved and extends outwardly and forwardly opening into the receiver 7 through the opening 15.

Figures 1, 2:
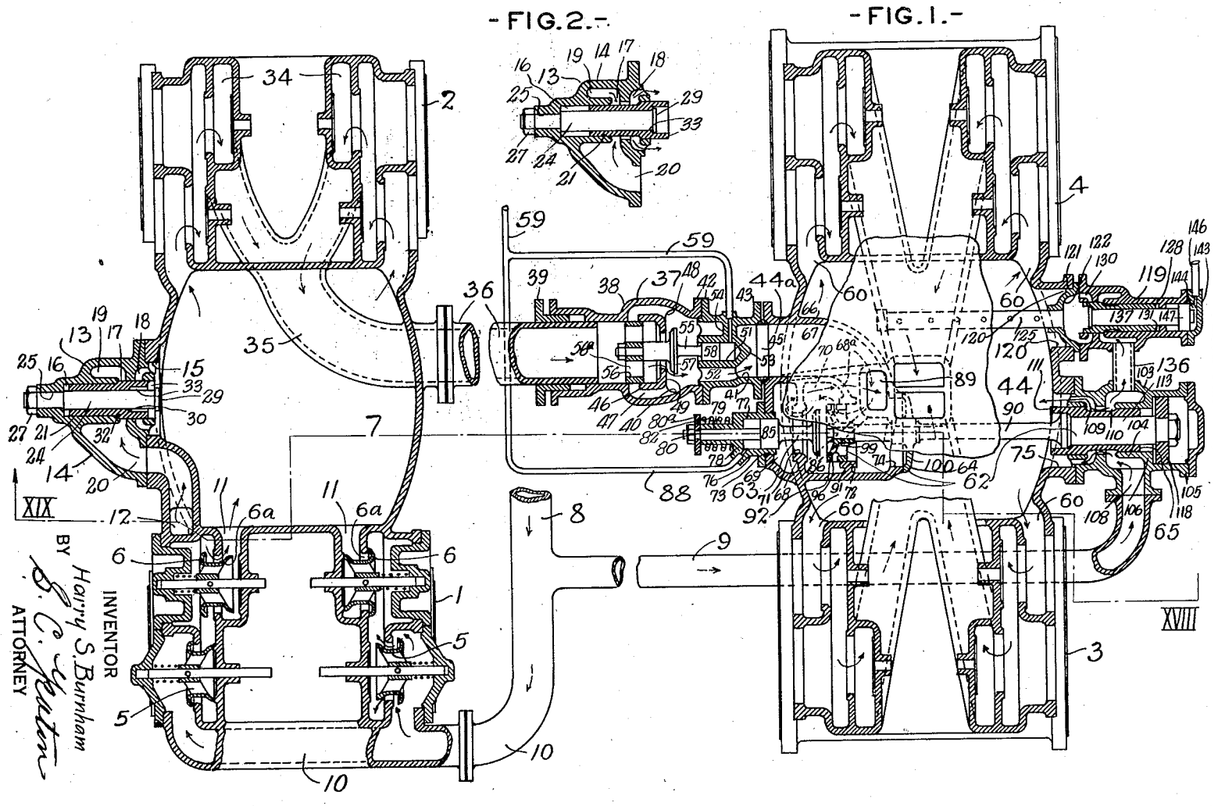
Figure 1 is a horizontal central sectional view through the working cylinder valve chests of a triple expansion engine embodying the apparatus of the present invention with the several valves of the apparatus also shown in horizontal central section, certain parts being broken away and other parts being omitted and the valves of the apparatus being shown in positions for single expansion engine operation of a majority of the cylinders.
Fig. 2 is a horizontal central sectional view of the reducing feed valve and adjacent parts, for the intermediate pressure cylinder, shown in Fig. 1, with the valve shown in open or starting position.
Figure 5:
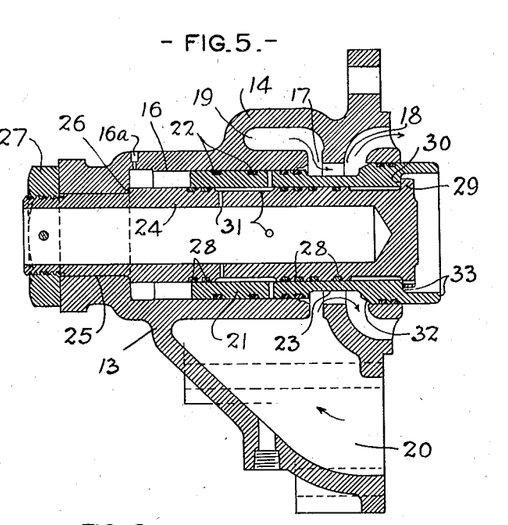
Figs. 5 to 8 are enlarged detail views of the structure shown in Fig. 2, Fig. 5 being a horizontal sectional view, Fig. 6 a front end view, Fig. 7 a half rear end view, and Fig. 8 a half side view.
Figure 6:
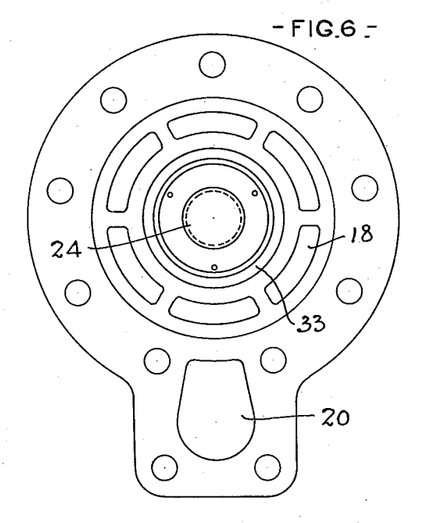
Figure 7:
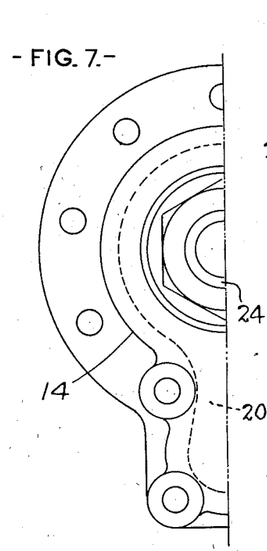
Figure 8:
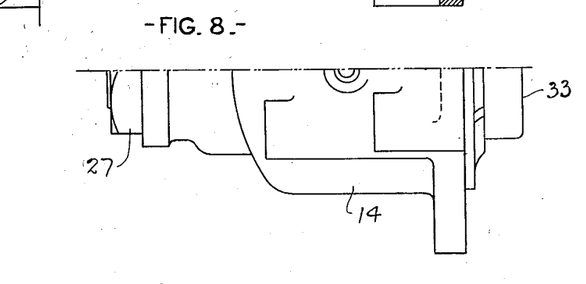
Figures 9, 12:
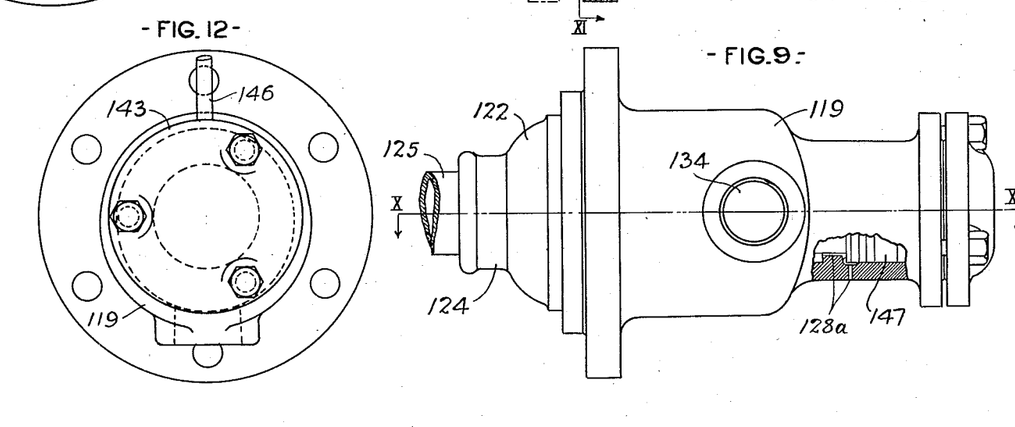
Figs. 9 to 12 are enlarged detail views of the structure shown in Fig. 3, Fig. 9 being a side view, partly in section, Fig. 10 a horizontal section on the line X—X of Fig. 9, with the discharge pipe shown fragmentally in plan, Fig. 11 a transverse section on the line XI—XI of Fig. 10, and Fig. 12 a front end view.

A sleeve 21 is disposed within the cylinder 16 and is adapted for reciprocation therein, suitable packing rings 22 being provided around the sleeve 21 between its outer wall and the inner wall of the cylinder 16 to insure a steam-tight engagement therebetween. Corresponding to the variation in the diameter of the cylinder, the forward portion of the sleeve 21 is of slightly greater diameter than the portion to the rear thereof so as to put the ports 17 and 18 in communication with each other when the sleeve is in its forward or open position as shown in Figs. 2 and 5. A circumferential groove 23 is formed in the outer wall of the sleeve 21 at the rear of the forward portion thereof. The groove 23 increases the opening between the ports 17 and 18 when the sleeve 21 is in its forward or open position, this being the open position of the valve 13 for delivery of live steam to the receiver 7 when starting the locomotive in operation. When the sleeve 21 is moved rearward from the position shown in Figs. 2 and 5 to the position shown in Fig. 1, the ports 17 and 18 will be closed, that is, held out of communication by the portion of the sleeve 21 of larger diameter, and the direct delivery of live steam to the receiver 7 will be prevented.

A hollow stem 24 is disposed through the cylinder 16 and sleeve 21. The steam 24 extends through an opening 25 formed in the rear end of the casing 14. A shoulder 26 formed on the stem 24 abuts the inner wall of the casing around the opening 25 and a nut 27 threadedly engages the outer end of the stem and holds the stem securely in position. The stem is of such diameter as to have a working clearance within the sleeve 21, and suitable packing rings 28 are provided around the stem between it and the inner wall of the sleeve 21 to insure steam-tight engagement therebetween while permitting the sleeve to reciprocate. A head 29 is formed on the forward end of the stem and the inner wall of the sleeve is outwardly offset near its forward end to provide a shoulder 30, which shoulder engages the head 29 when the sleeve is in its forwardmost position, the forward movement of the sleeve 21 being thus limited. A passage 16a is formed at the rear end of the cylinder 16 for opening the space behind the sleeve 21 to the atmosphere. Also suitable passageways 31 are formed in the stem 24 and sleeve 21. These passageways serve to minimize the passage of steam, which has leaked past the packing rings 22 and 28 at the forward end of the sleeve and stem, to the space behind the sleeve 21, this steam being permitted to pass through and out of the hollow of the stem 24.

The unbalanced surface of the sleeve indicated at 32 against which live steam from passageway 20 is adapted to exert pressure and the unbalanced surfaces of the sleeve indicated at 33 against which steam within the receiver 7 is adapted to exert pressure are so proportioned as to affect a sleeve which will be moved rearwardly to closed position when the pressure within the receiver is increased a predetermined amount relative to the pressure in the passageway 20 and the sleeve will be moved forwardly to open position when the pressure within the receiver is below that predetermined relative amount. The ratio will be fixed so that the valve will be opened when the amount of pressure within the receiver is below the amount necessary for the proper operation of the intermediate working cylinder 2, which is the case in starting, and will be closed when the pressure is at or above that amount.

It will thus be apparent that the operation of the valve 13 is entirely automatic and that normally the steam for the intermediate working cylinder 2 will be supplied to the receiver 7 through the passageways 11, that is, only the steam exhausted from the high pressure working cylinder 1 will be normally used for the operation of the cylinder 2. During the starting of the locomotive however the intermediate cylinder will always be operated for at least a few reciprocations by the aid of live steam admitted through valve 13, that is, it will be so operated until the steam pressure within the receiver 7 is built up and sufficient exhaust steam from the cylinder 1 is supplied through the passageways 11 for the operation of the intermediate cylinder by exhaust steam as aforedescribed, and thereupon the valve 13 will automatically close.

The exhaust passageways 34 of the valve chest of the intermediate pressure cylinder 2 are connected to a passageway 35 integrally formed within the chamber 7 and extending forwardly therefrom. A receiver pipe 36 is connected to the forward end of the passageway 35 and extends forwardly for delivery of steam exhausted from the intermediate pressure cylinder 2 for the operation of the low pressure cylinders 3 and 4.

Figures 13, 14, 15, 16, 17:
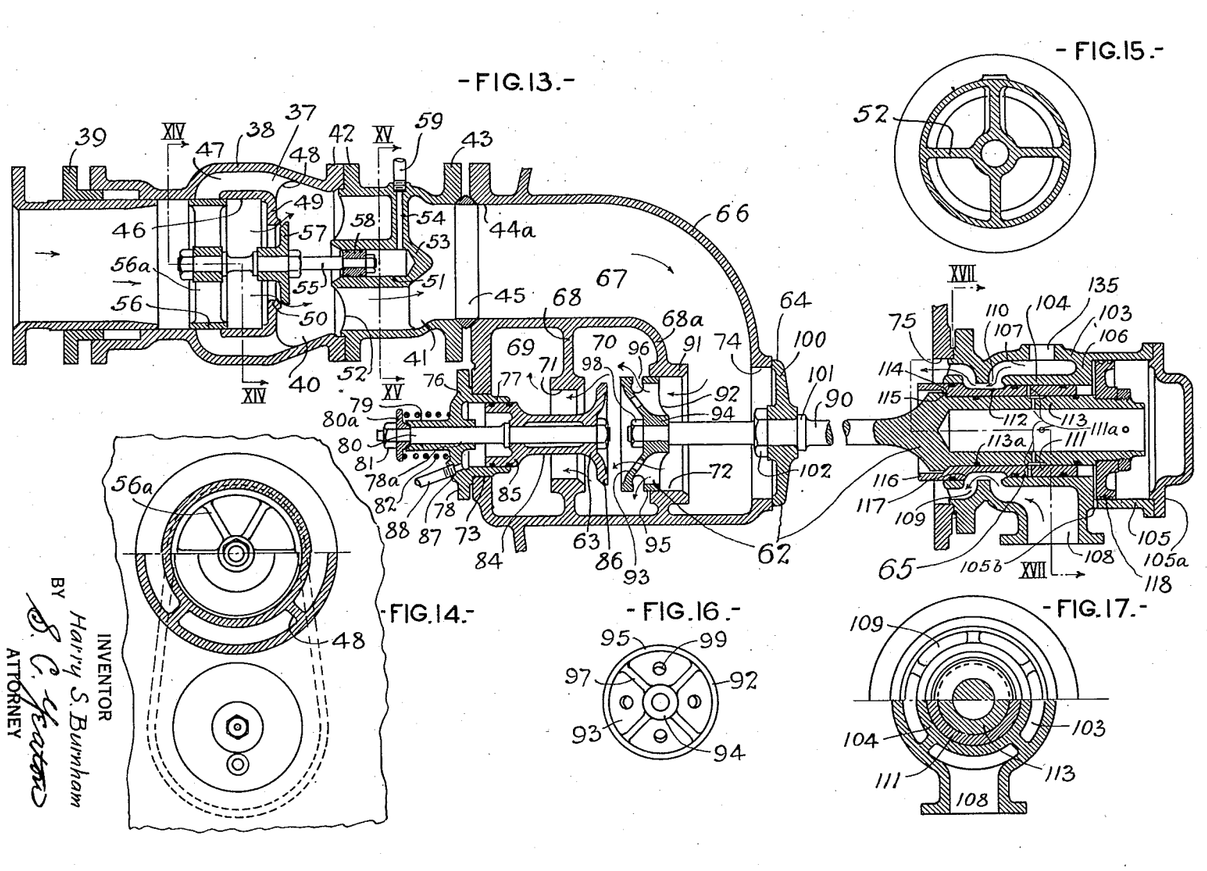
Fig. 13 is an enlarged horizontal central sectional view of the back pressure valve, separate exhaust valve, intercepting valve, and reducing feed valve for the low pressure cylinders, shown in Fig. 1, a part being broken away.
Fig. 14 is a section on the line XIV—XIV of Fig. 13.
Fig. 15 is a section on the line XV—XV of Fig. 13.
Fig. 16 is an end view of one of the valve elements of the intercepting valve, viewed from the right in Fig. 13.
Fig. 17 is a section on the line XVII—XVII of Fig. 13.

A back pressure valve 37 is disposed at the forward end of the receiver pipe 36, see particularly Fig. 13. One of the purposes of this valve is to maintain a sufficient amount of back pressure against the intermediate pressure cylinder piston, during simple or single expansion operation only of a majority of the cylinders, to maintain the proper balance of work. The valve 37 comprises an outer cylindrical casing 38 which is concentric with the pipe 36. For the purpose of facility in assembling, the casing 38 is made in two separate portions, a rear portion 40 and a forward portion 41. The portions 40 and 41 are provided with circumferential flanges 42 which are suitably connected together by bolts (not shown). The portion 40 is slidably connected at its rear end to the forward end of the pipe 36 in a well-known manner, a suitable packing gland 39 being provided to insure a steam-tight connection. At the forward end of the portion 41 a circumferential flange 43 is provided and is suitably connected by bolts (not shown) to a similar flange formed around an opening 44a formed in a wall of a receiver 44, a joint ring 45 being interposed between the flanges.

Within the casing portion 40 an inner cylinder 46 is centrally disposed, providing an annular passageway 47 therearound between its outer surface and the inner surface of the casing portion 40. The cylinder 46 is integrally formed with the casing portion 40 and is suitably held in place by radial webs 48. A closure 49 is provided at the forward end of the cylinder 46 and an opening 50 is centrally formed in the closure 49.

In the casing forward portion 41 a cylinder 51 is centrally disposed. This cylinder is formed integrally with the portion 41 and is secured thereto and held in place by suitable webs 52. The cylinder 51 is closed at its front end by a head 53 and a pipe or passageway 54 leads from the interior of the cylinder 51, at the forward end thereof, to the outside of the casing portion 41. The cylinder 51 is open at its rear end.

Figures 3, 4:
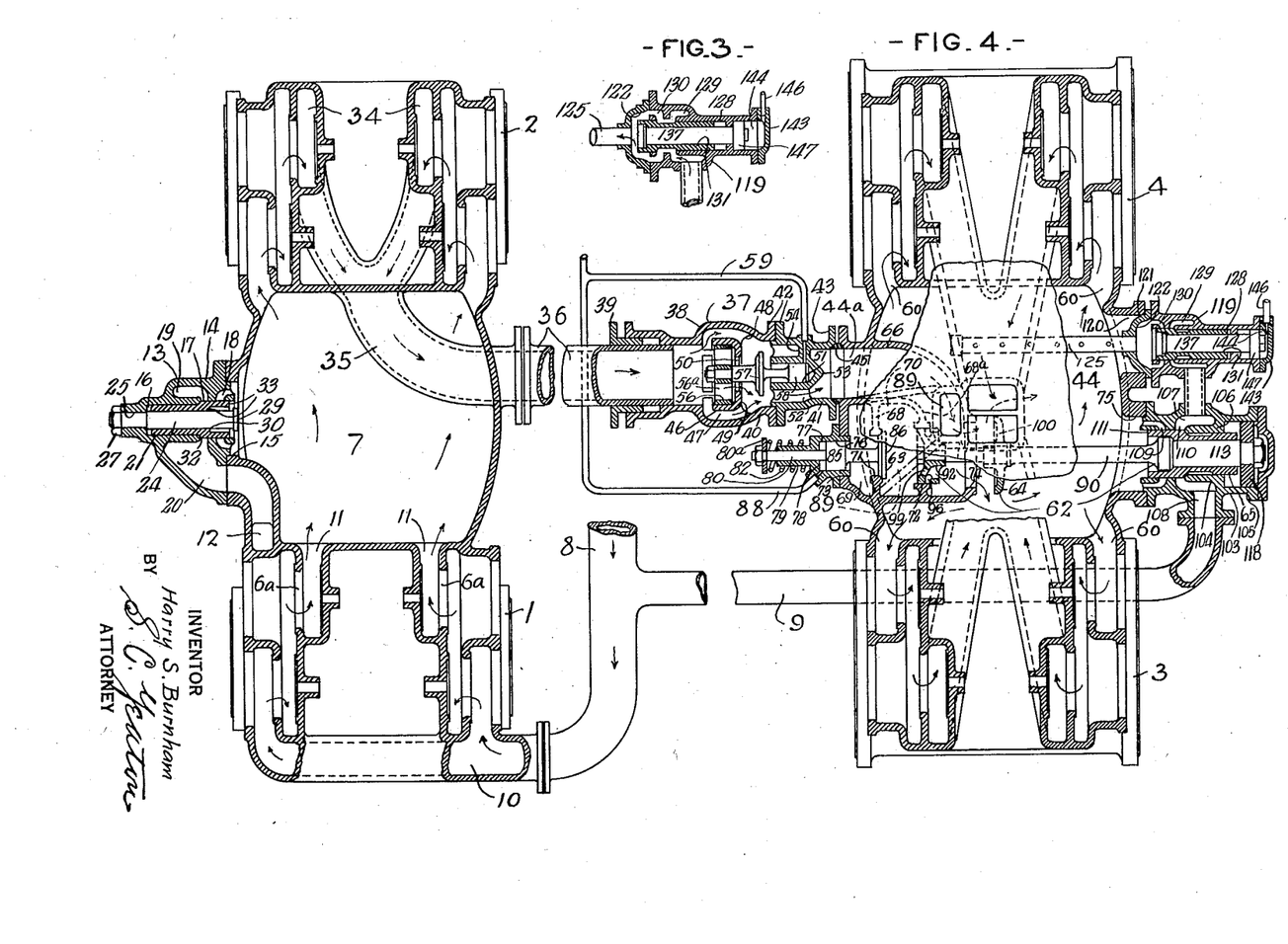
Fig. 3 is a horizontal central sectional view of the regenerator valve and adjacent parts shown in Fig. 4, with the valve shown in open position.
Fig. 4 is a view similar to Fig. 1, with certain parts shown in Fig. 1 omitted, showing the various valves of the apparatus of the present invention in positions for normal triple expansion engine operation.

Centrally disposed within the casing 38 is a piston rod 55. Upon the rear end of the piston rod 55 a cylindrical valve element 56 is secured by suitable webs 56a. When in closed position, as shown in Figs. 1 and 13, the valve element 56 is adapted to extend over the rear open end of the annular passageway 47 closing this end of the passageway. The valve element is longitudinally movable to open position as shown in Fig. 4, in which open position the rear end of the passageway 47 is open permitting steam to flow freely through the passageway 47 around the cylinder 46. A valve disc 57 is secured on the piston rod 55 at the central portion thereof. The disc 57 is adapted when the valve element 56 is in closed position, as shown in Figs. 1 and 13, to substantially close the opening 50 so that steam passing through the valve will be restricted a predetermined amount, and when the valve element 56 is in open position, as shown in Fig. 4, the disc 57 will leave the opening 50 substantially unrestricted for the passage of steam therethrough as well as through the passageway 47.

Figures 19, 20, 21:
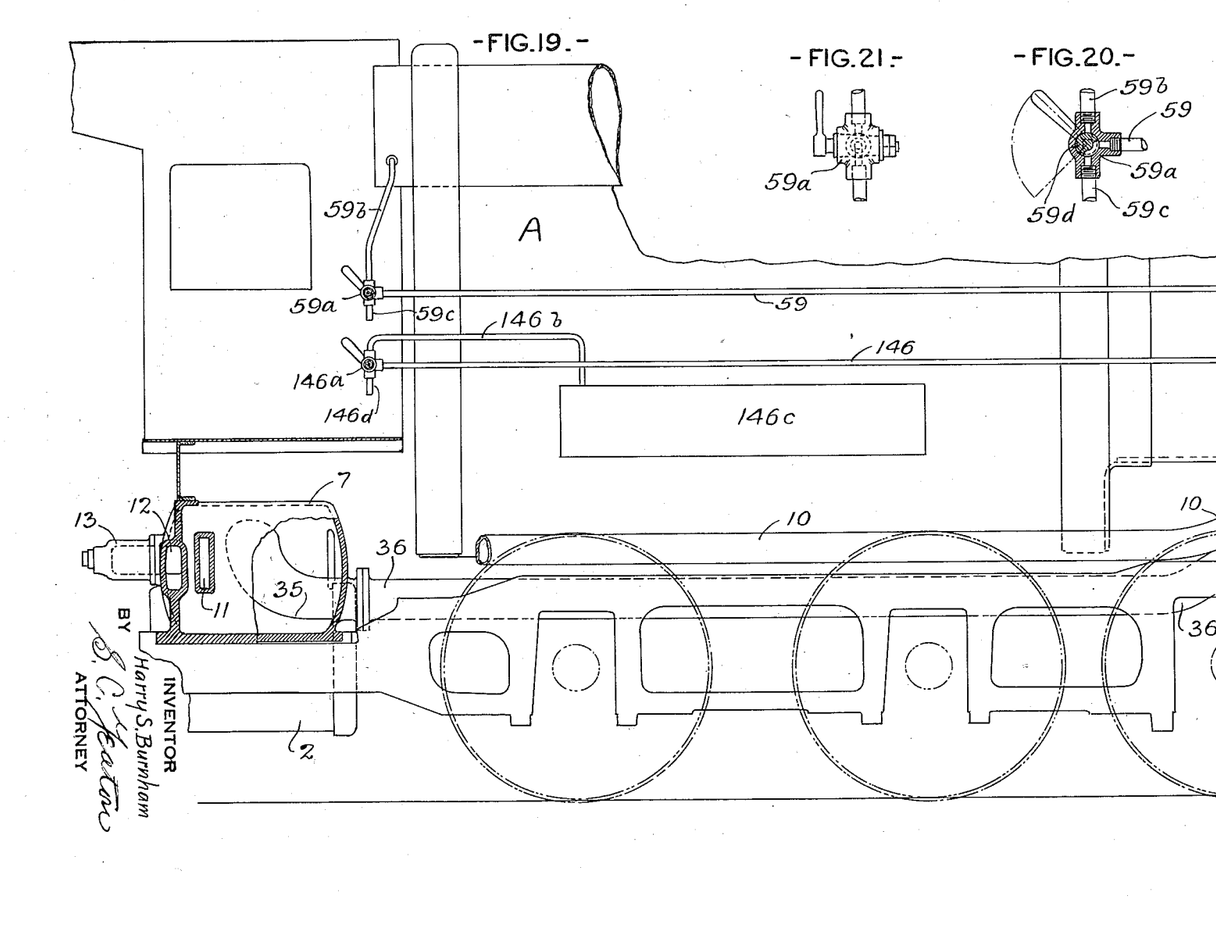
Fig. 20 is a vertical sectional view of the manual control valve for the back pressure and separate exhaust valves.
Fig. 21 is an end view of the valve shown in Fig. 20.

An operating piston 58 is secured at the forward end of the piston rod 55 and is reciprocably disposed within the cylinder 51. A pipe 59 is connected to the passageway 54 and extends to a three-way manually controllable valve 59a (see Figs. 20 and 21) of usual construction located in the cab of the locomotive indicated generally by the reference character A. One of the ways or connections of the valve 59a is connected by a pipe 59b to the steam drum of the boiler and another of the ways is connected to a pipe 59c which leads to the atmosphere, the pipe 59 being connected with the third way and thereby being adapted to selectively be brought into communication with the steam boiler or with the atmosphere when the plug or valve element 59d of the valve is appropriately turned. Thus when the valve element 59d is turned so as to connect the pipe 59 and passageway 54 with the boiler, steam will enter the forward end of the cylinder 51 and force the piston 58 rearwardly so as to close the valve 37, that is, bring the valve element 56 over the rear end of the passageway or port 47 and bring the disc 57 into a position partially closing the opening 50.

The pressure required to open the valve 37, that is, force the disc 57 away from the opening 50 will be equal to the operating or boiler pressure divided by the ratio of the area of the valve disc 57 which is subjected to the steam pressure of the pipe 36 to the area of the piston 58 which is subjected to pressure within the cylinder 51 plus the small amount of pressure at the forward side of the disc 57. It will be apparent that this back pressure will be constant for various pressures of steam delivered through the pipe 36 as long as the operating pressure which is delivered to the cylinder 51 is constant, that is, a predetermined back pressure will be maintained although the outflow of steam from the intermediate pressure cylinder varies.

The receiver 44 heretofore mentioned is disposed between the valve chests of the low pressure cylinders 3 and 4, and these valve chests, the receiver 44 and the low pressure cylinders are all formed as an integral one-piece casting. Inlet ports 60 are formed at each of the inlet valve chests and are in communication with the receiver 44 for receiving steam therefrom for operating the low pressure cylinders. The exhaust passageways of the exhaust valve chests lead to the atmosphere in the usual manner.

An intercepting valve device indicated generally by the numeral 62 is provided in connection with the receiver 44. The intercepting valve device includes a separate exhaust valve 63, an intercepting valve proper 64 and a reducing feed valve 65, see particularly Fig. 13. A casing 66 is formed in the rear portion of the receiver 44 for the separate exhaust valve 63 and intercepting valve proper 64. A passageway 67 is provided in the casing 66, the rear end of this passageway opening at the rear of the receiver 44, in communication with the front end of the back pressure valve 37 through the opening 44a formed in the wall of the receiver 44, for receiving steam delivered from the intermediate pressure cylinder 2.

Walls 68 and 68a are integrally formed with the casing 66 providing chambers 69 and 70 separate from the passageway 67 and the remainder of the receiver 44. The chambers 69 and 70 are in communication with each other through an opening 71 formed in the wall 68 between these chambers. An opening 72 is also formed in the wall 68a for providing communication between the chamber 70 and the forward end of the passageway 67. An opening 73 is provided in the rear wall of the receiver 44 for a purpose hereinafter described and an opening 74 is formed in the front wall of the casing 66 for providing communication between the passageway 67 and the receiver 44 exterior of the casing 66. The openings 71, 72, 73 and 74 are all in alignment with each other. An opening 75 for a purpose hereinafter described is provided in the front wall of the receiver 44, also in alignment with the openings 71 to 74.

A valve casing 76 is provided at the rear end of the receiver 44 and comprises a cylindrical body portion 77 which extends through the opening 73 into the chamber 69, a cover 78 which closes the rear end of the body portion and is secured to the rear wall of the receiver 44 around the opening 73 by studs (not shown), and a hollow neck 79 which extends outwardly from the cover. The neck is in communication with the interior of the body portion through an opening 78a formed in the cover. A stem 80 is extended through the neck and body portion and is adapted for reciprocation therein. A head 80a is provided on the outer end of the stem 80 at the outside of the neck and is secured thereto by a nut 81. A helical spring 82 is disposed around the neck 79 and bears at its forward end against the cover 78 and at its rear end against the head 80a so as to resiliently tend to force the stem 80 rearwardly.

At the forward end of the stem 80 the separate exhaust valve 63 is secured. The separate exhaust valve 63 surrounds the stem 80 and comprises a cylindrical body portion 84, a piston 85 formed at its rear end, and a valve disc 86 formed at its forward end. The piston 85 operates within the cylindrical portion 77. The disc 86 is adapted, when the valve 63 is in its rearwardmost or closed position, as shown in Fig. 4, to rest upon a seat formed around the opening 71 and to close this opening. A port 87 is formed in the cover 78 and a pipe 88 is connected at one of its ends to said port and at its other end to the pipe 59 aforedescribed. Steam is introduced into and exhausted from the interior of the cylindrical portion 77 by manipulations of the valve 59a, at the same times and in the same manner as described with reference to the cylinder 51. The pressure of this steam, boiler pressure, will be sufficient to hold the valve 63 in open position, as shown in Figs. 1 and 13, against the force of the spring 82 and when the steam is exhausted from the cylindrical portion 77 the force of the spring will move the valve 63 rearwardly and bring the valve disc 86 back upon its seat, closing the opening 71, as shown in Fig. 4. The chamber 69 is connected by a suitable passageway 89 to the engine exhaust pipe 89a which of course is in communication with the atmosphere through the stack 89b in the usual manner.

Thus it will be apparent that the opening of valve disc 86 will permit steam from the chamber 70 to pass to the atmosphere through opening 71, chamber 69 and passageway 89 and thereby effect movement of the unbalancing valve 92, hereinafter described, to full open position, allowing comparatively free flow of steam from passageway 67 through the opening 72 and thence as just described to the atmosphere.

A valve disc 100, hereinafter further described, is provided for the opening 74. A valve stem 90 is provided for the unbalancing valve 92, the valve disc 100 and the reducing feed valve 65. An annular flange 91 is formed around the opening 72 in the wall 68a. The annular unbalancing valve 92 is disposed within the flange 91 and adapted to reciprocate therein.

The valve 92 (see particularly Fig. 13) comprises a conically shaped plate 93, a hub 94 formed centrally of the plate and an outer annular wall 95 around the hub spaced forwardly of the outer periphery of the plate so as to provide in effect an annular port 96. The hub 94 is connected by webs 97 with the plate 93 and annular wall 95. The hub 94 is hollow and the rear end of the stem 90 is passed therethrough, a nut 98 provided at the end of the stem 90 securing the valve 92 to the stem. The annular port 96 permits the free passage of steam from the passageway 67 into the chamber 70 when the intercepting valve device is in the position shown in Figs. 1 and 13, while when the intercepting valve device is in open position, that is, that shown in Fig. 4, the port 96 is adjacent the flange 91 and thereby closed. Openings 99 are provided in the plate 93 and it will be apparent that even in the closed position of the unbalancing valve 92 steam will pass through the openings 99 into the chamber 70, and by virtue of this arrangement when the disc 86 has closed the port 71 a certain amount of pressure will be built up within the chamber 70. Thus when the separate exhaust valve 63 is in closed position and the disc 100 is open the valve 92 will have no disturbing effect upon the disc 100. Also the value 92 acts to effect a quick closing of the disc 100 when steam is exhausted from the chamber 70 to the atmosphere by reason of the rapid decrease in pressure on the rear side of the valve 92 relative to the pressure on the forward side thereof.

The stem 90 passes centrally through the disc 100 and is provided with a collar 101 which abuts the front surface of the disc 100 while a nut 102 threadedly engages the stem 90 at the rear side of the disc 100 forcing the disc against the collar and securing it to the stem. When the intercepting valve device 62 is in closed position, as shown in Figs. 1 and 13, the disc 100 rests upon a seat provided by the periphery of the opening 74 at the front side of the casing 66 and closes this opening thereby shutting off the receiver 44 exterior of the casing 66 from the casing 66. When the valve disc 100 is in open position, as shown in Fig. 4, the passageway 67 is open to the interior of the receiver 44 exterior of the casing 66 for supplying steam exhausted from the intermediate pressure cylinder for operating the low pressure cylinders.

A valve casing 103 is disposed at the forward end of the receiver 44 at the outside thereof, over the opening 75. The casing 103 is shaped similar to the casing 14 of the valve 13, being provided with a cylinder or body portion 104 which is open at its rear end opposite to the opening 75. The casing 103 is suitably secured to the receiver by studs (not shown) passed through a circumferential flange formed on the rear end of the cylinder 104 and extended into the receiver wall around the opening 75. A cylinder 105 of larger diameter than the cylinder 104 is disposed at the forward end of the cylinder 104, and a wall 106 joins the two cylinders, which are open to each other at their adjacent ends.

An annular passageway 107 is formed around the cylinder 104 and an inlet passageway 108 connects and merges with the passageway 107. A pair of spaced annular ports 109 and 110 is formed in the cylinder 104. The port 109 extends outwardly or radially and rearwardly, opening into the receiver 44. The port 110 extends outwardly or radially and forwardly, opening into the annular passageway 107 and the passageway 108. Similar to the cylinder 16 of the valve 13, the portion of the cylinder 104 rearward of the port 110 is of a slightly greater inner diameter than the portion of the cylinder forward thereof. A sleeve 111 is fitted in the cylinder 104 and adapted for reciprocation therein. Similar to the sleeve 21, the outer diameter of the forward portion of the sleeve 111 is slightly less than the outer diameter of the rear portion thereof, corresponding to the difference in diameter of the forward and rear portions of the cylinder 104, so that when the sleeve is in its rearward or open position, as shown in Figs. 1 and 13, the ports 109 and 110 will be in communication with each other.

The sleeve is provided with suitable packing rings between its outer surface and the inner surface of the cylinder 104 to insure a steam-tight fit. A circumferential groove 112 is formed in the outer surface of the sleeve 111 at the rear end of its forward portion. When the sleeve is in rearward or open position the groove 112 increases the opening between the ports 109 and 110 so that steam may pass freely from the passageway 108 to the interior of the receiver 44. The passageway 108 is connected to the live steam branch pipe 9 for receiving steam for the operation of the low pressure cylinders at certain periods as already stated.

An enlarged hollow end 113 is formed at the forward end of the valve stem 90. The enlarged end 113 fits within the sleeve 111 and is adapted for longitudinal movement relative thereto. Suitable packing rings 113a are provided between the end 113 and sleeve 111 to insure a steam-tight fit. An inwardly extending shoulder 114 is formed at the rear end of the sleeve 111 and an outwardly extending shoulder 115 is formed at the rear of the enlarged end 113. These two shoulders are adapted for engagement with each other so that the sleeve is limited in its rearward travel.

The surface 116 of the end of the sleeve 111 and the portion of the shoulder 114 against which steam within the receiver 44 is adapted to exert pressure, and the unbalanced surface of the sleeve against which steam from the pipe 108 is adapted to exert pressure, as indicated at 117, are so proportioned that when the steam pressure within the receiver 44 falls so that the ratio of the steam pressure within the receiver 44 to the boiler pressure or pressure of the steam within the pipe 108 is changed beyond a predetermined amount, steam from the pipe 108 will force the sleeve 111 rearwardly to open position, as shown in Figs. 1 and 13, provided of course the stem 90 is in rearward position so that the shoulder 115 will permit such position of the sleeve. The pressure of the live steam will, however, be sufficient to move both the sleeve 111 and stem 90 rearwardly to open positions in the starting of the engine.

Passageways, indicated generally at 111a are provided in the sleeve 111 and in the enlarged hollow end 113, and a passageway 105b is provided in the cylinder 105. The passageways 111a correspond to the passageways 31 and the passageway 105b corresponds to the passageway 16a in the valve 13. The purposes of the passageways 111a and 105b are the same as the purposes of the corresponding passageways in the valve 13, as hereinbefore described. The passageway 105b also serves to relieve compression back of a piston head 118 hereinafter described.

When the steam pressure within the receiver 44 is built up, that is, rises so that the pressure ratio between the steam within the receiver 44 and the pipe 108 is changed beyond the said predetermined amount, due to the difference in the effective areas of the combined surfaces provided by the shoulder 114 and that indicated at 116, and the surface indicated at 117, and the different pressures acting thereon, the sleeve 111 will be forced forwardly to closed position, thereby cutting off the delivery of live steam through the valve 65 to the receiver 44. It will also be apparent that when the stem 90 is moved forwardly to the open position for the valve disc 100 aforementioned, due to the shoulders 114 and 115, the sleeve will be brought to and held in closed position, as shown in Fig. 4.

The piston head 118 is secured on the outer end of the enlarged end 113 of the valve stem 90. The piston head 118 is adapted to reciprocate within the cylinder 105. A cover 105a is provided over the outer end of the cylinder 105. There is thus provided by the cylinder 105 a dash pot which will act to cushion the movement of the valve stem 90 and the several members secured thereto.

A regenerator live steam feed valve 119 is provided at the forward end of the receiver 44 at one side of the feed valve 65. An opening 120 is provided in the wall of the receiver 44. A seat 121 is provided around the opening and a semispherical hollow member 122 having a peripheral flange 123, extends into the opening with its flange bearing against the seat 121. The member 122 is provided with a hollow inwardly extending neck 124 and an inlet pipe 125 is secured at its forward end in the neck 124. The pipe extends rearwardly in the receiver 44, is closed at its rear end with a cap 126 and is provided with a plurality of perforations 127 permitting the passage of steam therethrough from the interior of the pipe into the receiver. The valve 119 comprises a cylinder 128 formed at its rear portion to provide an annular passageway 129. The passageway 129 extends radially inward at its rear end through the wall of the cylinder 128. A curved passageway 130 is formed in the cylinder 128 to the rear of the passageway 129. The passageway 130 extends radially and rearwardly through the wall of the cylinder 128 opening into the hollow member 122. The inner diameter of the portion of the cylinder 128 rearward of the passageway 129 is greater than the inner diameter of the portion of the cylinder forward of the passageway 129.

Figure 10:
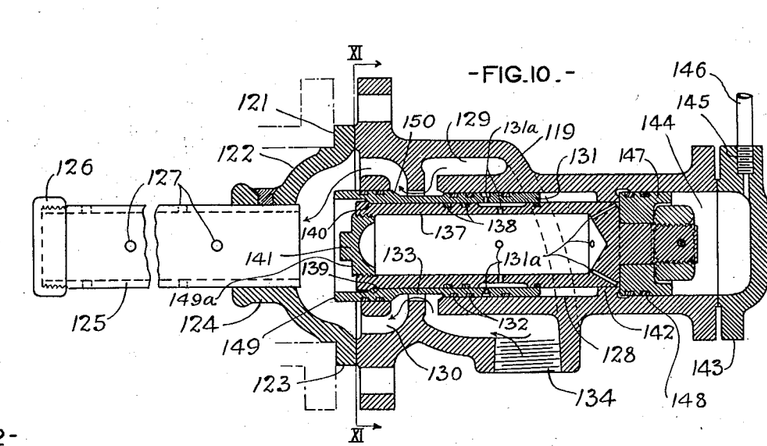
Figure 11:
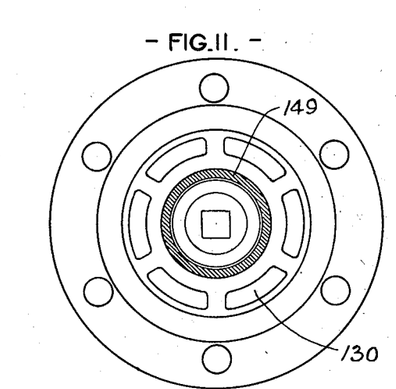

A sleeve 131 is disposed within the cylinder 128 and is adapted for reciprocation relative thereto, suitable packing rings 132 being provided between the outer surface of the sleeve and the inner surface of the cylinder to insure a steam-tight fit therebetween. Corresponding to the different inner diameters of the cylinder 128, the forward portion of the sleeve 131 is of less diameter than the rear portion thereof, so that the passageways 129 and 130 are in communication with each other when the sleeve 131 is in its rearward or open position as shown in Figs. 3 and 10. A circumferential groove 133 is formed in the outer wall of the sleeve 131 at the rear end of its forward portion, so that when the sleeve is in open position an increased opening will be provided between the passageways 129 and 130.

A port 134 is provided in the wall of the cylinder 128 in communication with the passageway 129. A port 135 is likewise provided in the wall of the casing 103 of the valve 65, the port 135 being in communication with the passageway 107 and hence with the passageway 108 and the pipe 9. A pipe 136 connects the port 134 with the port 135. It will be apparent that when the sleeve 131 is in the open position aforedescribed live steam will be permitted to pass from the pipe 9 through the valve 119 into the receiver 44.

A hollow piston rod 137 is disposed within the sleeve 131 and adapted for reciprocation therein, suitable packing rings 138 being provided between the outer wall of the piston rod 137 and the inner wall of the sleeve 131 to insure a steam-tight fit therebetween. Passageways indicated generally at 131a are provided in the sleeve 131 and the piston rod 137 and a passageway 128a is provided in the cylinder 128. The passageways 131a correspond to the passageway 31 and the passageway 128a corresponds to the passageway 16a in the valve 13. Thus these passageways 131a and 128a in the valve 119 serve the same purposes as their corresponding passageways in the valve 13, as hereinbefore described. The passageway 128a also serves to relieve compression back of a piston head 147 on the rod 137 and to provide communication with the atmosphere for the passageways 131a at the front end of the piston rod 137.

An inwardly extending shoulder 139 is formed on the inner wall of the sleeve 131 near the rear end thereof and an outwardly extending shoulder 140 is formed on the rear end of the piston rod 137. The shoulder 139 is adapted to abut the shoulder 140 limiting the rearward movement of the sleeve 131 relative to the piston rod, and when the piston rod 137 is in closed position, as shown in Fig. 1, serves to hold the sleeve in closed position so as to cut off communication between the passageways 129 and 130. The piston rod 137 is hollow, to save weight, and is closed at its rear end by a plug 141, there being thus provided a relatively great area against which steam pressure at the rear of the piston rod 137, that is, steam within the receiver 44, will act to force the piston rod 137 and consequently the sleeve 131 (if it is in open position) forwardly into closed position. An annular inward projection 142 is formed within the cylinder 128 spaced rearwardly from the forward end thereof. The inner diameter of the annular projection is the same as the outer diameter of the piston rod 137 and the piston rod is adapted to move through the annular projection.

The cover plate 143 is provided at the extreme forward end of the cylinder 128 thus providing a chamber 144. A port 145 is provided in the cover plate in communication with the chamber 144 and an air pipe 146 is connected to the port 145. A piston head 147 is secured to the forward end of the piston rod 137 and is adapted to reciprocate within the chamber 144, suitable packing rings 148 being provided between the outer wall of the piston head 147 and the inner wall of the chamber 144 to provide an air-tight fit.

The pipe 146 leads to a manually controllable three-way valve 146a which is similar in construction and operation to the valve 59a and is also located in the cab of the locomotive. One way of the valve 146a is connected by a pipe 146b to a compressed air container 146c and another way of the valve is connected to a pipe 146d which leads to the atmosphere, the third way being connected to the pipe 146. By suitable operation of the valve 146a the pipe 146 may thus be selectively connected with the source of compressed air or container 146c or with the atmosphere. Thus when compressed air is supplied to the pipe 146 the piston head 147 is moved rearwardly permitting the sleeve 131 to move to open position under suitable conditions.

The surface of the sleeve against which the steam pressure of the receiver 44 is adapted to exert force, indicated at 149, and the surface of the sleeve against which the live steam from the pipe 9 is adapted to exert force, indicated at 150, are so proportioned that with the piston rod 137 held in rearward position by the manually controlled air pressure in the chamber 144 aforedescribed, the sleeve 131 will be moved to open position by live steam in passageway 129 acting on the unbalanced area of the surface 150 against the resistance of receiver steam pressure on the surface 149, and thereby admit the aforementioned live steam into receiver 44 at reduced pressure. Upon release of the air pressure from chamber 144 the steam pressure in receiver 44 acting on the combined areas 149 and 149a will force the sleeve 131 and piston rod 137 to closed position against the live steam pressure in passageway 129 acting on the unbalanced area of the surface 150, and the sleeve will remain closed as long as the aforementioned receiver pressure remains at or above a predetermined amount called "holding pressure", or until piston rod 137 is manually moved rearward. In practice the regenerator (sometimes designated "accelerator") valve 119 is designed so as to be controlled by a slightly lower minimum receiver pressure (holding pressure) than that maintaining the multiple (triple) expansion position of the intercepting valve arrangement to avoid any tendency of the regenerator valve 119, that is to say the sleeve 131 and rod 137, to lift and slam when the engine is thrown into single expansion operation of a majority of the cylinders by the manually controlled movement of the intercepting valve arrangement to a position corresponding to said single expansion operation.

In the operation of the engine for starting, steam will be delivered through the pipe 8 and branch pipe 10 to the distribution valve chests of the high pressure cylinder 1 and also to the feed valve 13 and therethrough to the receiver 7 and from the receiver 7 to the distribution valve chests of the intermediate pressure cylinder 2. At the same time steam will be delivered through the branch pipe 9 and through the feed valve 65 to the receiver 44 and from the receiver 44 to the distribution valve chests of the low pressure cylinders 3 and 4.

During this starting period the separate exhaust valve 63 will be closed. Also the intercepting valve disc 100 will be closed and the valve 92 will be open.

After a few strokes of the working cylinders, when exhaust steam is being delivered through the passageways 11 into the receiver 7, and pressure within the receiver 7 has been built up, the feed valve 13 will automatically close, and the intermediate cylinder 2 will thereupon be operated solely by exhaust steam from the high pressure cylinder. At this time pressure of the exhaust steam from the intermediate cylinder will have been built up at the rear of the intercepting valve disc 100 sufficiently to automatically open the intercepting valve disc. The feed valve 65 will be thereby closed unless it has been previously closed by the pressure in the receiver 44. The cylinders 3 and 4 will thereupon be driven solely by exhaust steam from the intermediate pressure cylinder for triple expansion engine operation.

If it is desired, however, to hold the engine in single expansion operation of a majority of the cylinders (i. e. operation by live steam of cylinders 1, 3 and 4), the separate exhaust valve 63 will be, by its hand-controlled means, as aforedescribed, brought to open position. With the separate exhaust valve in open position steam from the receiver pipe 36, that is, intermediate pressure cylinder exhaust steam, will be exhausted to the atmosphere so that the intercepting valve disc 100 will be held in closed position and the said single expansion operation of the low pressure cylinders will be continued. In order to permit the engine to go into triple expansion operation, it will thereafter only be necessary to close the separate exhaust valve through operation of the valve 59a and the engine will automatically go into triple expansion operation as aforedescribed.

If it is desired to bring the engine into single expansion operation of a majority of the cylinders (i. e., operation by live steam of cylinders 1, 3 and 4), after it has been operating triple expansion, it is only necessary to open the separate exhaust valve. It will be apparent that the only time the separate exhaust valve is open is when the engine is being held by the operator in single expansion operation of a majority of the cylinders (operation by live steam of cylinders 1, 3 and 4), and that in order to maintain this single expansion operation the separate exhaust valve must be held open by the operator.

When the separate exhaust valve is closed the back pressure valve is always in open position permitting free passage of the exhaust steam through the receiver pipe to the receiver 44 for triple expansion operation of the engine as shown in Fig. 4. When the separate exhaust valve is held open the back pressure valve is always at the same time held substantially closed, as clearly shown in Fig. 1. It will be apparent that by virtue of the location and function of the back pressure valve the pressure of the steam exhausted from the intermediate pressure cylinder will be held up to a predetermined amount back of the back pressure valve, also that, although the full volume of this exhaust steam is passed through the valve it will be released in more nearly a continuous flow and consequently at comparatively low pressure after leaving the back pressure valve.

Also, as it is unnecessary to restrict the separate exhaust passageway in order to provide back pressure, as was the case in intercepting valve arrangements heretofore used, the separate exhaust valve is so proportioned that the exhaust is comparatively free when the separate exhaust valve 86 is open. Furthermore, when this valve is manually opened to put the engine into single expansion operation of a majority of the cylinders, the back pressure valve disc 57 and valve element or sleeve 56 are also caused to move rearward, as previously described, thereby throttling the exhaust from the higher pressure cylinders, and at the same time limiting the exhaust container volume to be effected by the separate exhaust valve to the cavity represented by the passageway 67, chamber 70 and receiver 44, as well as also tending to lower the pressure therein. It is evident that this combination of imposed restrictions in the higher pressure cylinders exhaust cavity, providing the above described reduction in the effective volume thereof and with the above mentioned free or wide open separate exhaust when the exhaust valve 86 is opened, will result in a very rapid and deep drop in the exhaust cavity pressure behind the intercepting valve disc 100 and consequently cause a positive and quick movement of the intercepting valve device 62 to its position for single expansion operation of a majority of the cylinders. The necessity for this rapid drop in the exhaust cavity pressure when manually changing the engine from multiple (triple) expansion to single expansion operation of a majority of the cylinders will be understood from the following description.

The sleeve 111, forward end 113 of valve stem 90, the associated parts of the reducing feed valve 65 of the intercepting valve device 62 must be designed so that the said valve 65 will be held closed against live steam (full boiler pressure) in passageway 107 by a pressure in the low pressure receiver 44 at, or preferably a little less than, the minimum receiver pressure when running the engine multiple (triple) expansion and at the shortest cut-off. Generally speaking the changing of the engine from multiple (triple) expansion operation to single expansion operation of a majority of the cylinders will not be required at the shorter cut-offs, but will be required at a time when the engine is working at maximum power (longest cut-off), and still is unable to perform the work required, or in other words is about to stall. Consequently it will be obvious that, at the comparatively high receiver pressure involved by the long cut-off, a very deep drop in pressure in the said cavity (passageway 67, chamber 70 and receiver 44), together with a rapid rush of steam through the unbalancing valve 92, must be attained to effect the desired movement of the intercepting valve disc 100 and feed valve 65 from multiple (triple) expansion positions to said positions for single expansion operation of a majority of the cylinders. This condition however could not be realized if the back pressure necessary against the exhaust of the intermediate cylinder was maintained throughout the passageway 89, chambers 69 and 70 and passageway 67 by a restricted separate exhaust outlet as was hereinbefore the practice.

It will be apparent that the regenerator feed valve 119, the operation of which has been previously described, operates entirely independently of the other valves and that its function is to effect an admission of live steam into the low pressure receiver to thereby raise the pressure within said receiver when desirable.

While there has been hereinbefore described an approved embodiment of the present invention it will be understood that many and various changes and modifications in form, structure and arrangement of parts may be made without departing from the spirit of the invention and it will be understood that all such changes and modifications as fall within the spirit of the invention as defined in the appended claims are contemplated as a part of this invention.

The invention claimed and desired to be secured by Letters Patent is:

1. In a triple expansion engine embodying a high pressure cylinder, an intermediate pressure cylinder and a low pressure cylinder, the combination of means for delivering live steam simultaneously to all of said cylinders for starting single expansion operation of said engine; means for delivering steam exhausted from said high pressure cylinder to said intermediate pressure cylinder for operating said intermediate pressure cylinder after said starting operation; means for delivering steam exhausted from said intermediate pressure cylinder to said low pressure cylinder for operating said low pressure cylinder during triple expansion operation of said engine; means for automatically cutting off delivery of live steam to said intermediate pressure cylinder when said high pressure cylinder exhaust steam is sufficient for operation of said intermediate pressure cylinder; and means for automatically cutting off delivery of live steam to said low pressure cylinder when exhaust steam delivered from said intermediate pressure cylinder is sufficient for operating said low pressure cylinder.

2. In a triple expansion engine embodying a high pressure cylinder, an intermediate pressure cylinder and a low pressure cylinder, the combination of means for delivering live steam simultaneously to all of said cylinders for starting single expansion operation of said engine; means for delivering steam exhausted from said high pressure cylinder to said intermediate pressure cylinder for operating said intermediate pressure cylinder after said starting operation; means for delivering steam exhausted from said intermediate pressure cylinder to said low pressure cylinder for operating said low pressure cylinder during triple expansion operation of said engine; means for automatically cutting off delivery of live steam to said intermediate pressure cylinder when said high pressure cylinder exhaust steam is sufficient for operation of said intermediate pressure cylinder; means for automatically cutting off delivery of live steam to said low pressure cylinder when exhaust steam delivered from said intermediate pressure cylinder is sufficient for operating said low pressure cylinder; and manually operated control means for holding the second said exhaust steam delivery means and the second said automatic means in positions continuing operation of said low pressure cylinder by live steam and for adjusting the second said exhaust steam delivery means and the second said automatic means to change from triple expansion operation of said engine to operation of said engine with said low pressure cylinder operated by live steam.

3. In a triple expansion engine embodying a high pressure cylinder, an intermediate pressure cylinder and a low pressure cylinder, the combination of means for delivering live steam simultaneously to all of said cylinders for starting single expansion operation of said engine; means for delivering steam exhausted from said high pressure cylinder to said intermediate pressure cylinder for operating said intermediate pressure cylinder after said starting operation; means for delivering steam exhausted from said intermediate pressure cylinder to said low pressure cylinder for operating said low pressure cylinder during triple expansion operation of said engine; means for automatically cutting off delivery of live steam to said intermediate pressure cylinder when said high pressure cylinder exhaust steam is sufficient for operation of said intermediate pressure cylinder; means for automatically cutting off delivery of live steam to said low pressure cylinder when exhaust steam delivered from said intermediate pressure cylinder is sufficient for operating said low pressure cylinder; and manually operated control means, including separate exhaust means for delivering said steam exhausted from said intermediate pressure cylinder to the atmosphere, for holding the second said exhaust steam delivery means and the second said automatic means in positions continuing operation of said low pressure cylinder by live steam and for adjusting the second said exhaust steam delivery means and the second said automatic means to change from triple expansion operation of said engine to operation of said engine with said low pressure cylinder operated by said live steam.

4. In a triple expansion engine embodying a high pressure cylinder, an intermediate pressure cylinder and a low pressure cylinder, the combination of means for delivering live steam simultaneously to all of said cylinders for starting single expansion operation of said engine; means for delivering steam exhausted from said high pressure cylinder to said intermediate pressure cylinder for operating said intermediate pressure cylinder after said starting operation; means for delivering steam exhausted from said intermediate pressure cylinder to said low pressure cylinder for operating said low pressure cylinder during triple expansion operation of said engine; means for automatically cutting off delivery of live steam to said intermediate pressure cylinder when said high pressure cylinder exhaust steam is sufficient for operation of said intermediate pressure cylinder; means for automatically cutting off delivery of live steam to said low pressure cylinder when exhaust steam delivered from said intermediate pressure cylinder is sufficient for operating said low pressure cylinder; manually operated control means, including separate exhaust valve means for delivering said steam exhausted from said intermediate pressure cylinder to the atmosphere, for holding the second said exhaust steam delivery means and the second said automatic means in positions continuing operation of said low pressure cylinder by live steam and for adjusting the second said exhaust steam delivery means and the second said automatic means to change from triple expansion operation of said engine to operation of said engine with said low pressure cylinder operated by said live steam; and means for effecting a determined amount of back pressure of said steam being exhausted from said intermediate pressure cylinder when said separate exhaust valve means is delivering said steam exhausted from said intermediate pressure cylinder to the atmosphere.

5. In a triple expansion engine embodying a high pressure cylinder, an intermediate pressure cylinder and a low pressure cylinder, the combination of means for delivering live steam simultaneously to all of said cylinders for starting single expansion operation of said engine; means for delivering steam exhausted from said high pressure cylinder to said intermediate pressure cylinder for operating said intermediate pressure cylinder after said starting operation; means for delivering steam exhausted from said intermediate pressure cylinder to said low pressure cylinder for operating said low pressure cylinder during triple expansion operation of said engine; means for automatically cutting off delivery of live steam to said intermediate pressure cylinder when said high pressure cylinder exhaust steam is sufficient for operation of said intermediate pressure cylinder; means for automatically cutting off delivery of live steam to said low pressure cylinder when exhaust steam delivered from said intermediate pressure cylinder is sufficient for operating said low pressure cylinder; means for effecting delivery of said exhaust steam from said intermediate pressure cylinder to the atmosphere during operation of said engine with said low pressure cylinder operated by live steam; manually operated control means for said two low pressure cylinder steam delivery means and said exhaust means adapted to permit triple expansion operation of said engine or to effect operation of said engine with said intermediate pressure cylinder operated by said exhaust steam from said high pressure cylinder and said low pressure cylinder operated by live steam; and back pressure valve means simultaneously controllable by said manually operated control means for effecting a back pressure of said steam being exhausted from said intermediate pressure cylinder when said steam is being delivered to the atmosphere.

6. In a multiple expansion engine, the combination of an intercepting valve; a separate exhaust valve; a live steam feed valve, said separate exhaust valve and intercepting valve being adapted for closed and open positions respectively for the delivery of steam exhausted from a cylinder of higher pressure to low pressure cylinder feed means and for open and closed positions respectively for directing said exhaust steam to the atmosphere, and said live steam feed valve being adapted for an open position for feeding live steam to said low pressure cylinder feed means and for a closed position for cutting off said feeding of live steam; and regenerator feed valve means adapted for an open position for feeding live steam to said low pressure cylinder feed means to augment other steam fed thereto and for a closed position for cutting off said feeding of augmenting steam.

7. In a multiple expansion engine, the combination of an intercepting valve; a separate exhaust valve; a live steam feed valve, said separate exhaust valve and intercepting valve being adapted for closed and open positions respectively for the delivery of steam exhausted from a cylinder of higher pressure to low pressure cylinder feed means and for open and closed positions respectively for directing said exhaust steam to the atmosphere, and said live steam feed valve being adapted for an open position for feeding live steam to said low pressure cylinder feed means and for a closed position for cutting off said feeding of live steam; regenerator feed valve means adapted for an open position for feeding live steam to said low pressure cylinder feed means to augment other steam fed thereto and for a closed position for cutting off said feeding of augmenting steam; and means for manually controlling the operation of said regenerator feed valve means.

8. In a multiple expansion engine, the combination of an intercepting valve; a separate exhaust valve; and a back pressure valve, said separate exhaust valve and intercepting valve being adapted for closed and open positions respectively for the delivery of steam from higher pressure cylinder exhaust means to low pressure cylinder feed means and for open and closed positions respectively for the delivery of said steam from said exhaust means to the atmosphere and said back pressure valve being adapted to open and close simultaneously with the closing and opening respectively of said separate exhaust valve to effect when closed a back pressure of steam in said exhaust means when said steam is being delivered to the atmosphere.

9. In a multiple expansion engine, the combination of an intercepting valve; a separate exhaust valve; a back pressure valve, said separate exhaust valve and intercepting valve being adapted for closed and open positions respectively for the delivery of steam from higher pressure cylinder exhaust means to low pressure cylinder feed means and for open and closed positions respectively for the delivery of said steam from said exhaust means to the atmosphere and said back pressure valve being adapted to open and close simultaneously with the closing and opening respectively of said separate exhaust valve to effect when closed a back pressure of steam in said exhaust means when said steam is being delivered to the atmosphere; and means for manually controlling the opening and closing of said separate exhaust valve and said back pressure valve.

10. A back pressure valve comprising a cylindrical casing adapted to receive steam at one end and to emit steam from its opposite end; a cylinder disposed within said casing providing an annular passageway therearound within said casing, said cylinder being open at its opposite ends; and valve means comprising an annular element movable to open and closed positions for respectively opening and closing said annular passageway and a disc movable with said annular element to open and closed positions for respectively fully opening one of said ends of said cylinder when said annular passageway is open and partially closing said end to restrict the passage of steam through said cylinder when said annular passageway is closed.

11. A back pressure valve comprising a cylindrical casing adapted to receive steam at one end and to emit steam from its opposite end; a cylinder disposed within said casing providing an annular passageway therearound within said casing, said cylinder being open at its opposite ends; valve means comprising an annular element movable to open and closed positions for respectively opening and closing said annular passageway and a disc movable with said annular element to open and closed positions for respectively fully opening one of said ends of said cylinder when said annular passageway is open and partially closing said end to restrict the passage of steam through said cylinder when said annular passageway is closed; and manually controlled means for said valve means for moving said annular element and disc to closed position.

12. A back pressure valve comprising a cylindrical casing adapted to receive steam at one end and to emit steam from its opposite end; a cylinder disposed within said casing providing an annular passageway therearound within said casing, said cylinder being open at its opposite ends; valve means comprising an annular element movable to open and closed positions for respectively opening and closing said annular passageway and a disc movable with said annular element to open and closed positions for respectively fully opening one of said ends of said cylinder when said annular passageway is open and partially closing said end to restrict the passage of steam through said cylinder when said annular passageway is closed; and manually controlled means for said valve means for moving said annular element and disc to closed position comprising a cylinder within said casing, a piston reciprocably disposed within said cylinder and connected with said annular element and disc, and means for introducing and exhausting fluid into and from said cylinder to effect movement of said piston.

13. A steam distribution control apparatus for a multiple expansion engine comprising means for delivering live steam for operating cylinders of the engine during single expansion engine operation; means including receiver means, a separate exhaust valve and an intercepting valve, for delivering steam exhausted from one of said cylinders to a second cylinder for operating said second cylinder during multiple expansion engine operation and for delivering said exhaust steam to the atmosphere during operation of said second cylinder by live steam, the live steam delivery means for said second cylinder and said intercepting valve being adapted for automatic operation when the supply of exhaust steam is sufficient for operating said second cylinder, to cut off said supply of live steam to said second cylinder, and said separate exhaust valve and intercepting valve being adapted to be manually controlled for effecting delivery of said exhaust steam to the atmosphere to effect said operation of said second cylinder by live steam; and a back pressure valve in said receiver means adapted to restrict the passage of said exhaust steam therethrough when said exhaust steam is being delivered to the atmosphere.

14. A multiple expansion engine comprising at least one higher pressure cylinder; a pair of lower pressure cylinders disposed forwardly of said higher pressure cylinder; distribution valve chests for each of said cylinders; means for delivering live steam to each of said valve chests for single expansion operation of said engine; means for delivering steam exhausted from said higher pressure cylinder to said lower pressure cylinder valve chests for operating said lower pressure cylinders; and valve means interposed in the two delivery means for said lower pressure cylinders adapted for automatic operation when the supply of said exhaust steam is sufficient for operating said lower pressure cylinders to cut off said delivery of live steam to said lower pressure cylinder valve chests and to be manually controlled for effecting delivery of said exhaust steam to the atmosphere to effect or maintain said operation of said lower pressure cylinders by live steam, said valve means being interposed between said two lower pressure cylinders and including a steam receiver for receiving said live steam and said exhaust steam and for the delivery thereof to the distribution valve chests of said lower pressure cylinders.

15. A multiple expansion engine comprising at least one higher pressure cylinder; a pair of lower pressure cylinders disposed forwardly of said higher pressure cylinder; distribution valve chests for each of said cylinders; means for delivering live steam to each of said valve chests for single expansion operation of said engine; means for delivering steam exhausted from said higher pressure cylinder to said lower pressure cylinder valve chests for operating said lower pressure cylinders; and valve means interposed in the two delivery means for said lower pressure-cylinders adapted for automatic operation when the supply of said exhaust steam is sufficient for operating said lower pressure cylinders, to cut off said delivery of live steam to said lower pressure cylinder valve chests and to be manually controlled for effecting delivery of said exhaust steam to the atmosphere to effect or maintain said operation of said lower pressure cylinders by live steam, said valve means being interposed between said two lower pressure cylinders and including a steam receiver for receiving said live steam, and said exhaust steam and for the delivery thereof to the distribution valve chests of said lower pressure cylinders and said lower pressure cylinders, their said valve chests and said receiver being formed as an integral casting.

16. A multiple expansion engine comprising at least one higher pressure cylinder; a pair of lower pressure cylinders disposed forwardly of said higher pressure cylinder; means for delivering live steam for operation of each of said cylinders; means including a receiver pipe for delivering steam exhausted from said higher pressure cylinder to the atmosphere and to said lower pressure cylinders for operating said lower pressure cylinders; valve means connected with the two delivery means for said lower pressure cylinders adapted for automatic operation when the supply of said exhaust steam is sufficient for operating said lower pressure cylinders to cut off said delivery of live steam for said lower pressure cylinders and to be manually controlled to effect or maintain operation of said lower pressure cylinders by live steam, said valve means being interposed between said lower pressure cylinders and including a steam receiver and said receiver pipe being connected with said higher pressure cylinder and with said receiver; and a back pressure valve disposed in said receiver pipe manually controlled to effect back pressure of said exhaust steam from said higher pressure cylinder when said exhaust steam is being delivered to the atmosphere.

17. In a locomotive a multiple expansion steam engine comprising a low pressure cylinder in the proximity of the smoke stack; a higher pressure cylinder disposed in spaced relation to said low pressure cylinder at the rear thereof; a steam passage extending forwardly from said higher pressure cylinder to said low pressure cylinder for conveying exhaust steam from said higher pressure cylinder to said low pressure cylinder for operating same; intercepting valve means at the forward end of said steam passage; and means connecting the intercepting valve means with the locomotive smoke stack.

18. In an engine, the combination of a working high pressure cylinder; means for supplying working live steam to said high pressure cylinder; a working intermediate pressure cylinder; means for supplying working exhaust steam of said high pressure cylinder to said intermediate pressure cylinder; valve contained means for supplying working live steam to said intermediate pressure cylinder when the valve is open and for cutting off the live steam supply when said valve is closed, said valve having valve opening and valve closing control means adapted to be actuated to valve open and valve closed positions by fluid pressures, said control means being adapted for subjection to the influence of the pressure of said live steam tending to actuate said control means to valve open position and for subjection to the pressure of said exhaust steam tending to actuate said control means to valve closed position, said control means being adapted for actuation to either of said positions by the corresponding actuating fluid pressure when at a predetermined preponderating amount relative to the other actuating fluid pressure whereby said intermediate pressure cylinder may be supplied with said live steam or with said exhaust steam only; a working low pressure cylinder; means for supplying working exhaust steam of said intermediate pressure cylinder to said low pressure cylinder; and a second valve contained means for supplying working live steam to said low pressure cylinder when the valve of said second means is open and for cutting off the live steam supply to said low pressure cylinder when the second said valve is closed, the said second valve having valve opening and valve closing control means adapted to be actuated to valve open and valve closed positions by fluid pressures, the second said control means being adapted for subjection to the influence of the pressure of said live steam tending to actuate the second said control means to valve open position and for subjection to the pressure of said exhaust steam of said intermediate pressure cylinder tending to actuate the second said control means to valve closed position, the second said control means being adapted for actuation to either of its said positions by its corresponding actuating fluid pressure when at a predetermined preponderating amount relative to its other actuating fluid pressure whereby said low pressure cylinder may be supplied with said live steam or with said exhaust steam of said intermediate pressure cylinder only.

19. In an engine, the combination of a working high pressure cylinder; means for supplying working live steam to said high pressure cylinder; a working intermediate pressure cylinder; means for supplying working exhaust steam of said high pressure cylinder to said intermediate pressure cylinder; a working low pressure cylinder; means for supplying working exhaust steam of said intermediate pressure cylinder to said low pressure cylinder; valve contained means for supplying working live steam to said low pressure cylinder when the valve is open and for cutting off the live steam supply when said valve is closed, said valve having valve opening and valve closing control means adapted to be actuated to valve open and valve closed positions by fluid pressures, said control means being adapted for subjection to the influence of the pressure of said live steam tending to actuate said control means to valve open position and for subjection to the pressure of said exhaust steam of said intermediate pressure cylinder tending to actuate said control means to valve closed position, said control means being adapted for actuation to either of said positions by the corresponding actuating fluid pressure when at a predetermined preponderating amount relative to the other actuating fluid pressure whereby said low pressure cylinder may be supplied with said live steam or with said exhaust steam only; manually controlled means for reducing said pressure tending to actuate said valve control means to valve closed position whereby said valve control means may be actuated by said live steam to valve open position or may be held in valve open position during the period of said manual control; and manually controlled intermediate-pressure-cylinder-exhaust-steam back-pressure-providing valve means disposed between said pressure reducing means and said intermediate pressure cylinder whereby said back pressure may be provided during said steam pressure reduction.

20. In a multiple expansion engine, the combination of a low pressure steam working cylinder; a higher pressure steam working cylinder; means for feeding working steam to said higher pressure cylinder; a passageway for feeding exhaust steam from said higher pressure cylinder to said low pressure cylinder; means disposed in said passageway for diverting said exhaust steam therefrom to prevent said exhaust steam from reaching said low pressure cylinder; means disposed in said passageway between said diverting means and said higher pressure cylinder comprising a valve adapted to effect exhaust steam back pressure for said higher pressure cylinder during said exhaust steam diversion; and means for feeding working steam to said low pressure cylinder for operating said low pressure cylinder during said exhaust steam diversion.

21. In a multiple expansion engine, the combination of a low pressure steam working cylinder; a higher pressure steam working cylinder; means for feeding working steam to said higher pressure cylinder; a passageway for feeding exhaust steam from said higher pressure cylinder to said low pressure cylinder; means disposed in said passageway for diverting said exhaust steam therefrom to prevent said exhaust steam from reaching said low pressure cylinder; a valve having a fluid controlled valve element disposed in said passageway between said diverting means and said higher pressure cylinder for yieldingly restricting said passageway to effect exhaust steam back pressure for said higher pressure cylinder during said exhaust steam diversion; and means for feeding working steam to said low pressure cylinder for operating said low pressure cylinder during said exhaust steam diversion.

22. In a multiple expansion engine, the combination of a low pressure steam working cylinder; a higher pressure steam working cylinder; means for feeding working steam to said higher pressure cylinder; a passageway for feeding exhaust steam from said higher pressure cylinder to said low pressure cylinder; means disposed in said passageway for diverting said exhaust steam therefrom to prevent said exhaust steam from reaching said low pressure cylinder; means disposed in said passageway between said diverting means and said higher pressure cylinder comprising a valve adapted to effect exhaust steam back pressure for said higher pressure cylinder during said exhaust steam diversion; manual control means for said diverting means and said back pressure effecting means operable to simultaneously effect said exhaust steam diversion and said exhaust steam back pressure; and means for feeding working steam to said low pressure cylinder for operating said low pressure cylinder during said exhaust steam diversion.

23. In a triple expansion engine embodying a high pressure cylinder, an intermediate pressure cylinder and a low pressure cylinder, the combination of means for delivering live steam simultaneously to all of said cylinders for single expansion operation for starting said engine; means for delivering steam exhausted from said high pressure cylinder to operate said intermediate pressure cylinder after said starting operation; means for delivering steam exhausted from said intermediate pressure cylinder to operate said low pressure cylinder during triple expansion operation of said engine; means for automatically cutting off delivery of live steam for said intermediate pressure cylinder when said high pressure cylinder exhaust steam is sufficient for operation of said intermediate pressure cylinder; and means for automatically cutting off delivery of live steam for said low pressure cylinder when exhaust steam delivered from said intermediate pressure cylinder is sufficient for operating said low pressure cylinder.

24. In a triple expansion engine, the combination of a high pressure steam working cylinder; an intermediate pressure steam working cylinder; two low pressure steam working cylinders; means for delivering high pressure steam to said high pressure cylinder for operating said cylinder; means for delivering live steam at a reduced pressure below the pressure of said steam delivered to said high pressure cylinder, for operating said intermediate pressure cylinder; means for delivering live steam at a reduced pressure, below the pressure of said live steam delivered for said intermediate pressure cylinder, for operating said low pressure cylinders; means for delivering steam exhausted from said high pressure cylinder for normal operation of said intermediate pressure cylinder; and means for delivering steam exhausted from said intermediate pressure cylinder for normal operation of said low pressure cylinders, whereby the steam delivered for operating said low pressure cylinders will be at a pressure reduced below the pressure of steam delivered to said intermediate pressure cylinder both during operation of said low pressure cylinders by exhaust steam and by live steam.

25. In a multiple expansion engine, the combination of a low pressure steam working cylinder; a higher pressure steam working cylinder; means for feeding working steam to said higher pressure cylinder; a normally substantially unrestricted passageway for feeding exhaust steam from said higher pressure cylinder to said low pressure cylinder; a second unrestricted passageway in communication with the atmosphere; means for diverting exhaust steam from the first said passageway to said second passageway for unrestricted release therethrough to the atmosphere to prevent said exhaust steam from reaching said low pressure cylinder; means disposed in the first said passageway between said higher pressure cylinder and said diverting means for effecting exhaust steam back pressure for said higher pressure cylinder during said exhaust steam diversion; and means for feeding working steam to said low pressure cylinder for operating said low pressure cylinder during said exhaust steam diversion.

26. In a multiple expansion engine, the combination of a low pressure steam working cylinder; a higher pressure steam working cylinder; means for feeding working steam to said higher pressure cylinder; a normally substantially unrestricted passageway for feeding exhaust steam from said higher pressure cylinder to said low pressure cylinder; a second unrestricted passageway in communication with the atmosphere; means normally closing said second passageway, operable to open said second passageway to effect, by said opening, diversion of exhaust steam from the first said passageway to said second passageway for unrestricted release therethrough to the atmosphere to prevent said exhaust steam from reaching said low pressure cylinder; means disposed in the first said passageway between said higher pressure cylinder and said diverting means for effecting exhaust steam back pressure for said higher pressure cylinder when said second passageway is open and said exhaust steam is being released to the atmosphere; and means operable by said opening for feeding working steam to said low pressure cylinder during said exhaust steam diversion.

HARRY S. BURNHAM.